United States Patent
Schaufl

(10) Patent No.: US 11,139,122 B2
(45) Date of Patent: Oct. 5, 2021

(54) ELECTROCHEMICAL ENERGY STORING DEVICE

(71) Applicant: MacroCaps ApS, Copenhagen (DK)

(72) Inventor: Rayk-Peter Schaufl, Borken (DE)

(73) Assignee: MacroCaps ApS, Copenhagen (DK)

( * ) Notice: Subject to any disclaimer, the term of this patent is extended or adjusted under 35 U.S.C. 154(b) by 56 days.

(21) Appl. No.: 16/470,580

(22) PCT Filed: Dec. 27, 2017

(86) PCT No.: PCT/EP2017/084601
§ 371 (c)(1),
(2) Date: Jun. 18, 2019

(87) PCT Pub. No.: WO2018/122231
PCT Pub. Date: Jul. 5, 2018

(65) Prior Publication Data
US 2019/0333714 A1    Oct. 31, 2019

(30) Foreign Application Priority Data
Dec. 30, 2016 (EP) .................................. 16207618

(51) Int. Cl.
| | |
|---|---|
| *H01G 11/82* | (2013.01) |
| *H01G 9/008* | (2006.01) |
| *H01G 9/045* | (2006.01) |
| *H01G 11/12* | (2013.01) |
| *H01G 11/52* | (2013.01) |
| *H01G 11/68* | (2013.01) |
| *H01G 11/76* | (2013.01) |

(52) U.S. Cl.
CPC ............. *H01G 11/82* (2013.01); *H01G 9/008* (2013.01); *H01G 9/045* (2013.01); *H01G 11/12* (2013.01); *H01G 11/52* (2013.01); *H01G 11/68* (2013.01); *H01G 11/76* (2013.01)

(58) Field of Classification Search
CPC ........ H01G 11/82; H01G 9/008; H01G 9/045; H01G 11/12; H01G 11/52; H01G 11/68; H01G 11/76; H01G 9/10; H01G 9/02; H01G 9/145; H01G 2009/0408; H01G 9/04; H01G 9/08
See application file for complete search history.

(56) References Cited

U.S. PATENT DOCUMENTS

| | | |
|---|---|---|
| 5,450,279 A | 9/1995 | Yoshida et al. |
| 2003/0184955 A1 | 10/2003 | Matsumoto et al. |
| 2004/0038124 A1 | 2/2004 | Hisamitsu et al. |

(Continued)

FOREIGN PATENT DOCUMENTS

WO    2014145259 A2    9/2014

OTHER PUBLICATIONS

International Preliminary Report on Patentability, dated Nov. 23, 2018.

*Primary Examiner* — Michael P McFadden
(74) *Attorney, Agent, or Firm* — Cahn & Samuels, LLP

(57) ABSTRACT

A very high capacity capacitor or energy storage comprising a two-layer electrode structure with a separator and an electrolytic fluid, where the electrodes are parallel and connected to one of two terminals. The electrodes are connected to the terminal along a large length so that the connection to the terminal has a low resistance and so that charging may take place faster and with less heat generation.

15 Claims, 5 Drawing Sheets

(56) References Cited

U.S. PATENT DOCUMENTS

| | | | |
|---|---|---|---|
| 2010/0195272 A1* | 8/2010 | Hasegawa | H01G 9/012 |
| | | | 361/540 |
| 2011/0085283 A1 | 4/2011 | Park et al. | |
| 2013/0224551 A1* | 8/2013 | Hiralal | H01M 4/0404 |
| | | | 429/127 |
| 2014/0134487 A1* | 5/2014 | Itaya | H01M 10/04 |
| | | | 429/211 |
| 2016/0163454 A1* | 6/2016 | Iwama | H01G 4/224 |
| | | | 361/301.4 |

* cited by examiner

PRIOR ART

ELECTROCHEMICAL ENERGY STORING DEVICE

This U.S. patent application is a national stage application of PCT/EP2017/084601 filed on 27 Dec. 2017 and claims priority of European patent document 16207618.6 filed on 30 Dec. 2016, the entireties of which are incorporated herein by reference.

The present invention relates to an electrical energy storing device of high density, preferably based on the Helmholtz double layer effect where a liquid conductor (electrolyte) comes into contact with a conductor (electrode) with large surface area (preferred porous carbon, folded graphene and so on) on the boundary of which the double layer effect appears.

BACKGROUND AND SUMMARY OF INVENTION

Electric Double-layer assemblies usually consist of a negatively charged carbon composite electrode and positively charged carbon composite electrode, separated from each other by a separator having a through-going porosity, whereas the active layer of both electrodes is formed by a microporous carbon or graphene layer and a conductive current collector material electrode.

A disadvantage of the capacitors according to the state of art is that they have a bottleneck or tapering that the current has to pass on its way from the electrode to a terminal outside of the capacitor housing. Such an unfavourable construction causes a high internal resistance.

To overcome the current limitations in terms of current flow and internal resistance, the task was to invent a new way of dimensional and current flow optimised electrode current collector assembly.

In a first aspect, the invention relates to a high capacitance capacitor having:
  a housing,
  a first plurality of first electrodes,
  a second plurality of second electrodes,
  a separator between each pair of a first and a second electrode, and
  an electrolytic liquid between electrodes and in the separator,
wherein:
  the first plurality of first electrodes are at least substantially parallel plate-shaped conductors each connected, at an edge thereof, to a first terminal, each first electrode extending a predetermined first distance, along a first predetermined direction, from the first terminal,
  the second plurality second electrodes are plate-shaped conductors at least substantially parallel to each other and to the first conductors and each connected, at an edge thereof, to a second terminal, one of the second plurality of conductors being positioned between a pair of neighbouring conductors of the first plurality, each second electrode extending a predetermined second distance, along a second, predetermined direction, from the second terminal,
  each of the first electrodes is connected to the first terminal over a distance exceeding the first distance,
  each of the second electrodes is connected to the second terminal over a distance exceeding the second distance,
  one side of the first terminal is exposed to the surroundings forming an outer surface of the housing and
  one side of the second terminal is exposed to the surroundings forming an outer surface of the housing.

In the present context, a high capacitance capacitor or energy storing device may be a device capable of storing large amounts of charge. A high capacitance capacitor may have a capacitance exceeding 100 kF, such as exceeding 250 kF, 500 kF or even more.

Capacitors usually have at least two electrodes in which charge may build up to generate an electrical field between the electrodes. This charge may then later be released again.

The present capacitor has a first plurality of first electrodes and a second plurality of second electrodes. The first electrodes are connected to a first terminal and the second electrodes are connected to a second terminal.

Preferably, a separate first electrode extends between each pair of two neighbouring second electrodes, so that the electrodes are positioned alternately.

A separator is preferably provided between each pair of a first and a second electrode. The separator may ideally be left out, but it has the job of ensuring that no first electrode directly contacts a second electrode. The separator preferably is able to allow the electrolytic liquid, or at least ions thereof, to pass through it.

As mentioned below, the electrodes preferably are of the two-layer type which is the presently most efficient type for capacitors.

The first and second electrodes are at least substantially parallel plate-shaped conductors. This parallel nature ensures that the distance between neighbouring electrodes is the same and may be made as small as possible in order to obtain a high efficiency and capacitance. This is usual in capacitors. Naturally, a production variation and deviation may take place, but preferably, the electrodes are as parallel as possible.

The plate-shape is a shape where the electrode has a shape with a thickness which is much lower, such as at least a factor of 5 but preferably at least a factor of 10, 20, 30 or more, than the longest, or even the shortest, dimension in a plane perpendicular to the direction of the thickness. Often, plate-shaped electrodes are flat or plane, but any shape may be used, such as a bent or curled shape. Preferably, the electrode has the same thickness throughout.

The first and second electrodes are each connected, at an edge thereof, to a first and a second terminal, respectively.

The first electrodes each extend a predetermined first distance, along a first predetermined direction, from the first terminal, and each of the first electrodes is connected to the first terminal over a distance exceeding the first distance. The same is the situation for the second electrodes.

In this context, the direction may be any direction, such as a direction perpendicular to the side at which the electrode is connected to the terminal. Then, the first and second directions may be parallel and opposite.

Actually, the first/second distance may be the shortest distance from any portion of the first/second electrode to the terminal.

Thus, preferably, the distance from the terminal to any portion of the electrode is smaller than the distance over which the electrode is connected to the terminal. This distance is preferably defined from the interface between the terminal and the electrode and defined as the shortest path therefrom, through the electrode and to the position in question.

Thus, the interface between the terminal and the electrode is large compared to the distance which the charge has to travel into the electrode. In this manner, a fast charging is possible.

The present capacitor thus, compared to the known, low capacity, wound capacitors, differs in that each of the electrodes is split up into multiple layers insulated by a separator and by enlarging the current collector to terminal connection.

In the situation where the first and/or second electrodes are rectangular, the terminal may be connected to a longer of the sides of the electrode—and along a portion, preferably the full length, of the side exceeding the length of the other sides of the rectangle.

Preferably, the first and second electrodes overlap when projected on to a plane parallel to one of the electrodes. This overlap preferably is as large as possible, such as at least 50%, such as at least 60%, such as at least 70%, such as at least 80%, such as at least 90% of the surface, in the cross section, where one electrode (such as a first electrode) overlaps the surface of a neighbouring electrode (such as a second electrode).

The capacitor comprises a housing and a first and second opposed, conducting surfaces, where the first opposed conducting surface is connected to the first plurality of electrodes and the second opposed surface is connected to the second plurality of electrodes. Actually, the first/second conducting surface are a surface of the actual first/second terminal.

The first and second terminals form the outer conducting surfaces of the housing. Thus, one side of each terminal (the inner side) is connected to the electrodes and the other side of each terminal (the outer side) is exposed to the surroundings, thereby forming an outer surface of the housing. Thus, the current can flow from the electrodes across the thickness of the terminal to the conducting surface of the housing, so that a low internal resistance is achieved. In capacitors according to the state of art, the current must flow from the electrodes at least along the terminal to a connection point outside the housing. According to the present invention, one side of each terminal is at least partially exposed to the surroundings. Preferably, one side of each terminal is completely exposed to the surroundings.

Preferably, the first and second terminals form two opposite outer surfaces of the housing. Thus, it is preferred that the capacitor of the present invention is provided in a housing with the terminals exposed on two opposite surfaces. This has the advantage that the capacitors may simply be stacked into a pile to be able to handle a higher voltage—or combined in parallel to achieve a higher capacitance.

Preferably, the two largest surfaces of the housing may be formed by the outer surfaces of the first and second terminals. Preferably, these surfaces are the outermost surfaces so that the capacitors may simply be stacked so that electrodes of adjacent capacitors touch.

The first and second terminals each have an area that overlaps, when projected to a plane parallel to the terminal, with at least 50%, more preferably with at least 75%, in particular with at least 90% of the edges of the electrodes at which the electrodes are connected to said terminal.

In a preferred embodiment, the first and second terminals each have an area, which overlaps, when projected to a plane parallel to the terminal, with the area formed by the electrodes that are connected to the terminal. Preferably, said area of the terminal overlaps with at least 50%, more preferably with at least 75%, in particular with at least 90% of said area of the electrodes.

In a preferred embodiment, the first and second terminals each have an area, which does not exceed, when projected to a plane parallel to the terminal, the area between the edges of the two outermost electrodes at which the electrodes are connected to the inner side of the terminal.

In a preferred embodiment, the first and second terminals do not stick out, when projected to a plane parallel to the terminals, of the outer edges of the remaining part of the housing.

Preferably, the first/second conducting surfaces are not only exposed to the surroundings of the housing but also extend the farthest away from a centre of the housing at those surfaces or sides, so that two capacitors may be stacked, whereby a first/second surface of one directly engages that of the other. Then, simple stacking of the capacitors is possible.

Preferably, the capacitor housing is box-shaped with two larger, opposite sides and four sides with a lower area, where the larger, opposite sides have or are constituted by the conducting surfaces.

Preferably, each of the first electrodes is connected to the first terminal over a distance exceeding 1.5 times the first distance and each of the second electrodes is connected to the second terminal over a distance exceeding 1.5 times the second distance. This factor may be much higher, such as at least 2 times, at least 3 times, at least 4 times or at least 5 times. The factor relates to the amount of charge fed through a unit length of the interface between the electrode and the terminal. The higher the factor, the lower the charge for the same electrode area and the same charging. The higher the factor, the faster a charging is possible and the lower heat generation is seen.

In one embodiment, the conductors are plane. This facilitates the manufacturing of large capacitors.

Preferably, the first and second electrodes are directly attached to the first and second terminal, respectively. This attachment or connection will transport the charge to/from the electrodes and preferably is made to have a low resistance. The attachment may be a fixing of the electrode directly to the terminal by press fitting or by soldering/welding using a material having a high electrical conductivity, such as a conductivity at least 50% of that of the electrode.

As mentioned above, preferably, at least one electrode, but preferably all electrodes, comprises a base layer or current collector and a coating on two opposite sides of the base layer. Thus, the known two-layer technology may be used.

Preferably, the coating has a large surface area, such as when comprising carbon and/or being structured, such as when comprising nanotubes.

Preferably, the base layer is made of an electrically conducting material, such as aluminium.

Preferably, the electrolytic liquid comprises 1-Ethyl-3-methylimidazolium bis (trifluoromethylsulfonyl)imide $(C_8H_{11}F_6N_3O_4S)$. In principle, any conducting liquid may be used, such as water, salty water or the like.

Preferably, the separator is porous and may e.g. comprise PTFE comprising pores allowing the electrolytic fluid pass there-into.

Naturally, the capacitor may be provided in any type of housing, such as housings known for capacitors for use in electronics and for attachment to a PCB.

However, the present capacitor is primarily aimed at a completely different area where much higher capacitances are desired for a very different purpose. The present capacitor may be dimensioned to store power from the grid when e.g. the frequency thereof needs to be corrected or when a surplus of power is to be stored for later use. Thus, the capacitances and the amount of charge to be stored are many orders of magnitude larger than what usual capacitors are made for. Capacitances on the order of 0.5 to 1 MF or even higher are foreseen, whereby the capacitor itself will have the size or volume as 10 k cm³ to 15 k cm³ (10-15 l) or even larger.

As mentioned below, a physical encoding of the surfaces may be provided, as the capacitor may be polarized so that it is important how capacitors are connected to each other.

BRIEF DESCRIPTION OF THE DRAWINGS

In the following, preferred embodiments will be described with reference to the drawing, wherein.

DETAILED DESCRIPTION OF THE INVENTION

Figure 1:
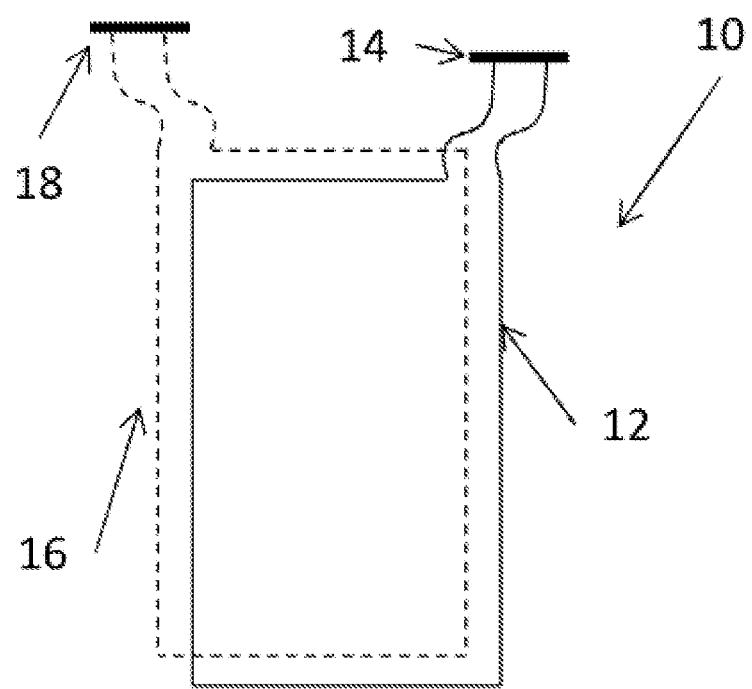
FIG. 1 illustrates a prior art high capacity capacitor.

FIG. 1 illustrates a prior art high capacitance capacitor having a number of first and second electrodes of which a first electrode 12 and a second electrode 16 are illustrated. The electrodes are provided in a parallel fashion and all first electrodes are connected to a first terminal 14 and all second electrodes are connected to a second terminal 18. Usually, in order to obtain a higher capacity (surface area), a fluid electrolyte is provided between the electrodes, and a separator material (not illustrated) is provided between each pair of neighbouring electrodes.

The connections are made via thin extensions of the electrode materials (at the top). A problem seen in this design is that the charge provided on an electrode must travel through the narrow extension of the electrode to be available at the terminal. This narrow extension creates a bottle neck increasing the internal resistance and thus the heat generation during fast charging/discharging. Also, the narrow extension limits the charging/discharging speed altogether.

Figure 2:
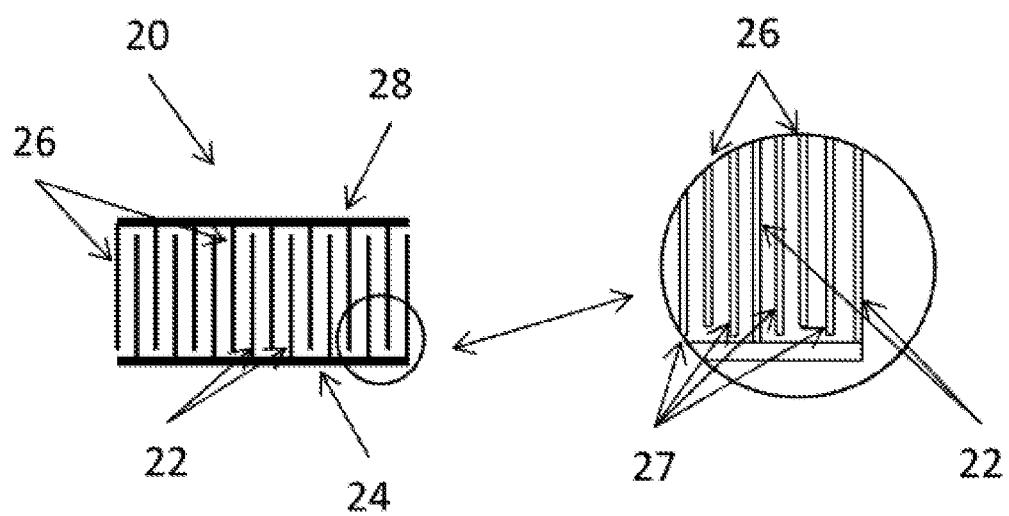
FIG. 2 illustrates a high capacity capacitor (the housing is only partly shown) according to the invention.

In FIG. 2, a capacitor 20 according to the invention is seen, where the elements of the circle have been expanded to illustrate the internal structure. For a better understanding of the construction details, parts of the capacitor housing are not shown. However, the first terminal 24 and the second terminal 28 that form the outer conducting surfaces of the housing are shown. The first and second terminals 24/28 form two opposite surfaces of the capacitor housing.

Again, first and second electrodes are provided in an interleaved, parallel structure. Again, separators 27 are provided between each pair of neighbouring electrodes, and a liquid electrolyte is provided between the electrodes and within the separator.

The first electrodes 22 are attached to a first terminal 24, and the second electrodes 26 are attached to a second terminal 28.

However, the electrodes are now directly attached to the terminal along a side thereof so that the charge is fed directly from the terminal to the electrode.

Figure 3:
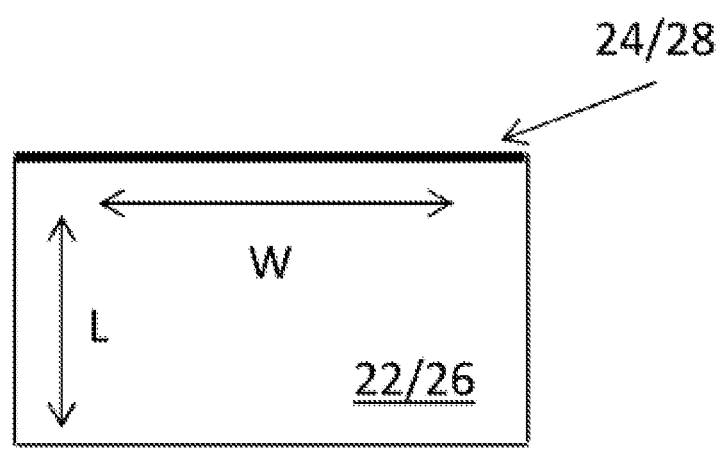
FIG. 3 illustrates the dimensions of an electrode for use in the capacitor of FIG. 2.

In fact, see FIG. 3, the electrodes 22/26 preferably are quadrangular and directly attached to the terminals (upper fat line) and have a width, W, along the edge attached to the terminal, which exceeds a length, L, thereof, where the length is in a direction away from the terminal, such as perpendicular thereto.

With this structure, the charge fed to the electrode is fed thereto over a large area, whereby the resistance is kept low. In addition, the distance which the charge has to travel is kept as short as possible, whereby also the resistance is minimized and the heat generation kept to a minimum while the charging/discharging time is optimized.

The dimensions are directly influencing the parameters of the capacitor. The length describes the distance which the charge has to travel and thus the charging/discharging time and the resistance and heat generation, whereas the width describes the overall capacitance of the capacitor.

Preferably, the electrodes comprise an inner layer, a current collector, and a coating thereof, the electrode material.

The preferred current collector is made of Aluminium, as it has a high conductivity and at the same time is cheap and light. Other conductors, however, may also be used, such as Copper, Gold and Silver. Basically any conductive element or composite thereof may be used.

Preferred electrodes are based on Porous Carbon and especially Carbon based materials with large surface areas, such as materials comprising nanotubes. Other conducting materials, such as silicon-based materials or composites with metal may be used.

The presently preferred electrolyte is 1-Ethyl-3-methyl-imidazolium bis (trifluoromethylsulfonyl)imide ($C_8H_{11}F_6N_3O_4S_2$). In general, water-based electrolytes are faster but have low decomposition voltages, whereas organic electrolytes are slower but have a higher decomposition voltages. Naturally, a fast electrolyte with a high decomposition voltage is desired.

Alternative electrolytes may be common organic electrolytes, such as tetraelthylammonium tetrafluoroborate (TEABF$_4$) ($C_8H_{20}BF_4N$)—($C_2H_5)_4N(BF_4$) in either propylene carbonate (PC) or acetonitrile (AN). Common aqueous electrolytes include KOH and $H_2SO_4$.

The presently preferred separator is a PTFE Based membranous material. Preferably, the separator is chemically inert, and has a customizable pore size and pore distribution.

Alternative separator materials may be paper, textile or tailored plastics. Basically, any material may be used, as long as it has pores big enough to let the electrolyte pass.

The present capacitor is especially suited for use with very large charges and thus as a very large capacitance. Capacitances on the order of 0.5 to 1 MF are foreseen, whereby the capacitor itself will have the size or volume as 10,000 cm³ to 15,000 cm³ (10-15 l). Thus, the present capacitor may be used in a very different context than small capacitors attached to a PCB.

The present capacitor is provided in a housing (see FIGS. 4 and 5) wherein, the terminals 24/28 form the outer conducting surfaces of the housing. Preferably, the terminals 24/28 are exposed on two opposite surfaces, so that the present capacitors may be simply stacked into a pile to be able to handle a higher voltage—or combined in parallel to achieve a higher capacitance.

Thus, the two largest surfaces of the housing 30 may be formed by the outer surfaces of the terminals 24/28 or elements connected to the electrodes. The housing 30 is preferably a box shaped housing. Preferably, these surfaces are the outermost surfaces so that capacitors may simply be stacked so that electrodes of adjacent capacitors touch. The first and second terminals 24/28 do not stick out, when projected to a plane parallel to the first and second terminals 24/28, of the outer edges of the remaining part of the housing 30. When projected to a plane parallel to the terminals, the first and second terminals 24/28 each has an area that overlaps with at least 50%, more preferably with at least 75%, in particular with at least 90% of the edges of the electrodes at which the electrodes are connected to the inner side of said terminal and also with at least 50%, more preferably with at least 75%, in particular with at least 90% of the area of the electrodes.

Figure 4:
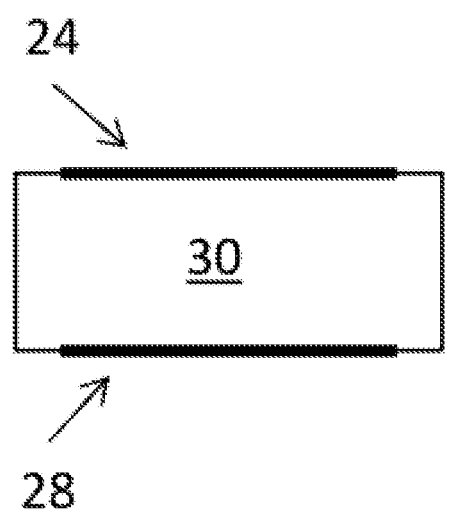
FIG. 4 illustrates the capacitor of FIG. 2 including housing seen from the side and FIG. 5 illustrates the capacitor of FIG. 4 from the top.
Figure 5:
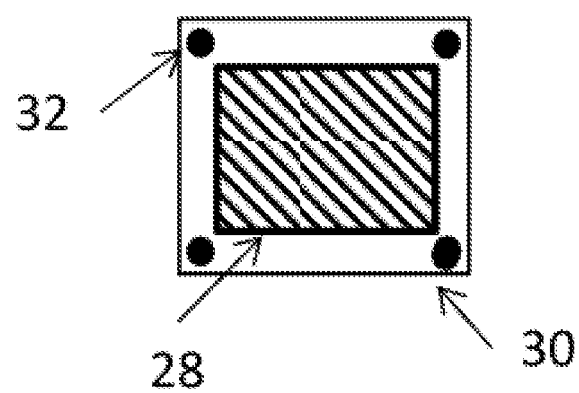

In FIG. 5, the capacitor of FIG. 4 is illustrated from the top. Thus, the terminal 28 that is exposed to the surroundings has an area, which does not exceed, when projected to a plane parallel to the terminal (≙top view), the area between the edges of the two outermost electrodes that are connected to the inner side of the terminal.

Furthermore, protruding elements 32 can be arranged at the side of the housing 30 comprising the terminal 28 forming the outer conductive surface, as the present type of capacitor is usually polarized. Corresponding indentations may be provided at the opposite side of the housing 30 comprising the terminal 24 (not indicated) forming the further outer conductive surface. Thus, the protruding elements 32 may be provided at one polarization to prevent oppositely polarized surfaces of other capacitors being connected to the terminal 28 of the housing. This is a simple physical encoding ensuring correct attachment of capacitors when stacking.

The invention claimed is:

1. A high capacitance capacitor having:
a housing,
a first plurality of first electrodes,
a second plurality of second electrodes,
a separator between each pair of a first and a second electrode, and
an electrolytic liquid between electrodes and in the separator,
wherein:
the first plurality of first electrodes are at least substantially parallel plate-shaped conductors each attached, along a furthermost edge thereof, directly to a first terminal, each first electrode extending a predetermined first distance, along a first predetermined direction, from the first terminal,
the second plurality second electrodes are plate-shaped conductors at least substantially parallel to each other and to the first conductors and each attached, along a furthermost edge thereof, directly to a second terminal, one of the second plurality of conductors being positioned between a pair of neighbouring conductors of the first plurality, each second electrode extending a predetermined second distance, along a second, predetermined direction, from the second terminal,
each of the first electrodes is connected to the first terminal over a distance exceeding the first distance,
each of the second electrodes is connected to the second terminal over a distance exceeding the second distance,
one side of the first terminal is exposed to the surroundings forming an outer surface of the housing,
one side of the second terminal is exposed to the surroundings forming an outer surface of the housing, and
the first and second electrodes are directly attached to the first and second terminal, respectively.

2. The capacitor of claim 1, wherein the first and second terminals form two opposite outer surfaces of the housing.

3. The capacitor of claim 1, wherein the first and second terminals each have an area that overlaps, when projected to a plane parallel to the terminal, with at least 50% of the edges of the electrodes at which the electrodes are connected to said terminal.

4. The capacitor according to claim 1, wherein the first and second terminals each have an area, which does not exceed, when projected to a plane parallel to the terminal, the area between the edges of the two outermost electrodes at which the electrodes are connected to the inner side of the terminal.

5. The capacitor according to claim 1, wherein the electrodes are planar.

6. The capacitor according to claim 1, wherein each of the first electrodes are connected to the first terminal over a distance exceeding 1.5 times the first distance and each of the second electrodes are connected to the second terminal over a distance exceeding 1.5 times the second distance.

7. The capacitor according to claim 6, wherein each of the first electrodes are connected to the first terminal over a distance exceeding 2 times the first distance and each of the second electrodes are connected to the second terminal over a distance exceeding 2 times the second distance.

8. The capacitor according to claim 1, wherein at least one electrode comprises a base layer and a coating on two opposite sides of the base layer.

9. A capacitor according to claim 8, wherein the coating comprises nanotubes.

10. A capacitor according to claim 8, wherein the base layer comprises an electrically conducting material.

11. A capacitor according to claim 8, wherein the coating comprises carbon.

12. A capacitor according to claim 8, wherein the base layer comprises aluminium.

13. A capacitor according to claim 1, wherein the electrolytic liquid comprises 1-Ethyl-3-methylimidazolium bis(trifluoromethylsulfonyl)imide ($C_8H_{11}F_6N_3O_4S_2$).

14. The capacitor according to claim 1, wherein the separator comprises PTFE comprising pores allowing the electrolytic fluid pass there-into.

15. The capacitor of claim 1, wherein the first and second terminals each have an area that overlaps, when projected to a plane parallel to the terminal, with at least 90% of the edges of the electrodes at which the electrodes are connected to said terminal.

* * * * *